(12) United States Patent
Li

(10) Patent No.: US 12,184,431 B2
(45) Date of Patent: Dec. 31, 2024

(54) METHOD AND DEVICE FOR TRANSMITTING HYBRID AUTOMATIC REPEAT REQUEST ACKNOWLEDGEMENT INFORMATION

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 358 days.

(21) Appl. No.: 17/771,615

(22) PCT Filed: Oct. 28, 2019

(86) PCT No.: PCT/CN2019/113757
§ 371 (c)(1),
(2) Date: Apr. 25, 2022

(87) PCT Pub. No.: WO2021/081717
PCT Pub. Date: May 6, 2021

(65) Prior Publication Data
US 2022/0407635 A1    Dec. 22, 2022

(51) Int. Cl.
*H04L 1/1829* (2023.01)
*H04L 1/1812* (2023.01)

(52) U.S. Cl.
CPC .......... *H04L 1/1864* (2013.01); *H04L 1/1812* (2013.01)

(58) Field of Classification Search
CPC ... H04L 1/1621; H04L 1/1864; H04L 1/1812; H04L 1/18; H04L 1/1861; H04L 1/0057; H04L 1/1858; H04L 5/0055; H04L 5/0057; H04L 1/1614; H04L 72/12; H04L 72/1273
See application file for complete search history.

(56) References Cited

U.S. PATENT DOCUMENTS

| | | | |
|---|---|---|---|
| 2019/0074952 A1* | 3/2019 | Bhattad | H04L 1/1822 |
| 2020/0154309 A1* | 5/2020 | Takeda | H04L 1/1614 |
| 2021/0314102 A1* | 10/2021 | Li | H04L 1/1614 |
| 2022/0368462 A1* | 11/2022 | Choi | H04W 72/1273 |

FOREIGN PATENT DOCUMENTS

| | | |
|---|---|---|
| CN | 108011696 A | 5/2018 |
| KR | 20190088565 A | 7/2019 |

OTHER PUBLICATIONS

European Patent Application No. 19951042.1, Search and Opinion dated Jul. 24, 2023, 11 pages.
PCT/CN2019/113757 International Search Report, dated Jul. 24, 2020 2 pages.

* cited by examiner

*Primary Examiner* — Mohamed A Kamara
(74) *Attorney, Agent, or Firm* — Cozen O'Connor

(57) ABSTRACT

A method for transmitting HARQ-ACK information is disclosed. A base station receives a feedback signal transmitted by a terminal when performing a HARQ feedback for a PDSCH; parses TB-level feedback information from the feedback signal according to a number of bits of the TB-level feedback information in the feedback signal; obtains a number of bits of CBG-level feedback information in the feedback signal according to the TB-level feedback information; and parses the CBG-level feedback information from the feedback signal according to the number of bits of the CBG-level feedback information.

18 Claims, 5 Drawing Sheets

METHOD AND DEVICE FOR TRANSMITTING HYBRID AUTOMATIC REPEAT REQUEST ACKNOWLEDGEMENT INFORMATION

CROSS-REFERENCE TO RELATED APPLICATION

This application is the US national phase application of International Application No. PCT/CN2019/113757, filed on Oct. 28, 2019, the entire contents of which are incorporated herein by reference.

TECHNICAL FIELD

The present disclosure relates to the field of wireless communication technologies, and in particular, to a method and an apparatus for transmitting hybrid automatic repeat request acknowledgement information, and a storage medium.

BACKGROUND

In the 5th generation mobile communication (5G) system, a Physical Downlink Shared Channel may be used for communication between devices. Each PDSCH corresponds to at least one transport block (TB), and each TB corresponds to a plurality of code block groups (CBGs).

When a terminal receives PDSCH, it needs to perform TB-level Hybrid Automatic Repeat request (HARQ) feedback (that is, feedback whether each TB in the PDSCH is successfully received) and CBG-level feedback (that is, feedback whether each CBG in each TB is successfully received). In the related art, in order to reduce the amount of feedback data, the terminal combines the feedback results of respective TBs in the PDSCH and the feedback results of respective CBGs in the TB of the PDSCH that fails to be received, into HARQ feedback information for the PDSCH, and sends the HARQ feedback information to the base station.

SUMMARY

According to a first aspect of the present disclosure, a method for transmitting hybrid automatic repeat request acknowledgement information is provided. The method is performed by a base station, and includes:
  receiving a feedback signal sent by a terminal when performing hybrid automatic repeat request (HARD) feedback for a physical downlink shared channel (PDSCH);
  parsing transport block-level (TB-level) feedback information from the feedback signal according to a number of bits of the TB-level feedback information in the feedback signal, wherein the TB-level feedback information includes a reception result of the terminal for each TB contained in the PDSCH;
  obtaining a number of bits of code block group-level (CBG-level) feedback information in the feedback signal according to the TB-level feedback information;
  parsing the CBG-level feedback information from the feedback signal according to the number of bits of the CBG-level feedback information, wherein the CBG-level feedback information includes a reception result of the terminal for each CBG in a TB that fails to be received on the PDSCH;
  wherein, the TB-level feedback information and the CBG-level feedback information are sent by the terminal after independent channel coding.

According to a second aspect of the present disclosure, a method for transmitting hybrid automatic repeat request acknowledgement information is provided. The method is performed by a terminal and includes:
  receiving downlink data on a physical downlink shared channel (PDSCH);
  generating transport block-level (TB-level) feedback information according to a reception result on the PDSCH, wherein the TB-level feedback information includes a reception result of the terminal for each TB contained in the PDSCH;
  generating code block group-level (CBG-level) feedback information according to the reception result on the PDSCH, wherein the CBG-level feedback information includes a reception result of the terminal for each CBG in a TB that fails to be received on the PDSCH;
  independently channel coding the TB-level feedback information and the CBG-level feedback information;
  reporting independently channel-coded TB-level feedback information and CBG-level feedback information to a base station.

According to a third aspect of the present disclosure, a base station is provided. The base station includes:
  a processor; and
  a memory configured to store instructions executable by the processor,
  wherein the processor is configured to:
  receive a feedback signal sent by a terminal when performing hybrid automatic repeat request (HARD) feedback for a physical downlink shared channel (PDSCH);
  parse transport block-level (TB-level) feedback information from the feedback signal according to a number of bits of the TB-level feedback information in the feedback signal, wherein the TB-level feedback information includes a reception result of the terminal for each TB contained in the PDSCH;
  obtain a number of bits of code block group-level (CBG-level) feedback information in the feedback signal according to the TB-level feedback information;
  parse the CBG-level feedback information from the feedback signal according to the number of bits of the CBG-level feedback information, wherein the CBG-level feedback information includes a reception result of the terminal for each CBG in a TB that fails to be received on the PDSCH;
  wherein, the TB-level feedback information and the CBG-level feedback information are sent by the terminal after independent channel coding.

According to a fourth aspect of embodiments of the present disclosure, a terminal is provided. The terminal includes:
  a processor; and
  a memory configured to store instructions executable by the processor,
  wherein the processor is configured to:
  receive downlink data on a physical downlink shared channel (PDSCH);
  generate transport block-level (TB-level) feedback information according to a reception result on the PDSCH, wherein the TB-level feedback information includes a reception result of the terminal for each TB contained in the PDSCH;
  generate code block group-level (CBG-level) feedback information according to the reception result on the PDSCH, wherein the CBG-level feedback information includes a reception result of the terminal for each CBG in a TB that fails to be received on the PDSCH;

independently channel code the TB-level feedback information and the CBG-level feedback information;

report independently channel-coded TB-level feedback information and CBG-level feedback information to a base station.

It is to be understood that the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure, and together with the description, serve to explain the principles of the present disclosure.

DETAILED DESCRIPTION

Figure 1:
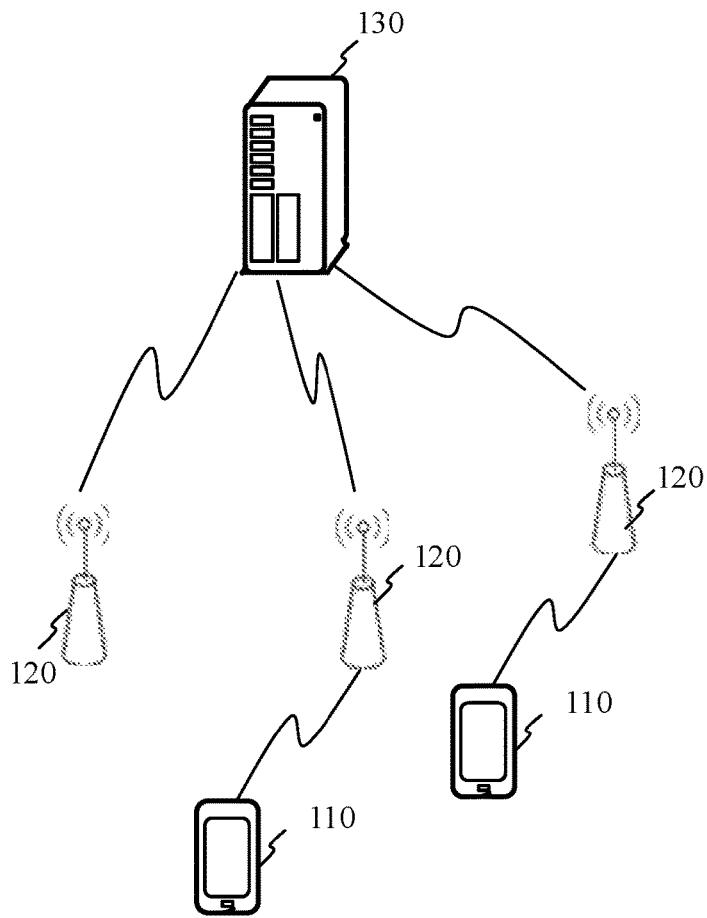
FIG. 1 is a schematic diagram of an implementation environment provided according to an embodiment.

Example embodiments will be described in detail herein, examples of which are illustrated in the accompanying drawings. Where the following description refers to the drawings, the same numerals in different drawings refer to the same or similar elements unless otherwise indicated. The implementations described in the illustrative examples below are not intended to represent all implementations consistent with this disclosure. Rather, they are merely examples of apparatus and methods consistent with some aspects of the present disclosure as recited in the appended claims.

It should be understood that reference herein to "several" refers to one or more, and "a plurality of" refers to two or more. "And/or", which describes the association relationship of the associated objects, means that there can be three kinds of relationships, for example, A and/or B can mean that A exists alone, A and B exist at the same time, and B exists alone. The character "/" generally indicates that the associated objects are in an "or" relationship.

Hybrid automatic repeat request (HARQ) is a technology formed by combining forward error correction (FEC) and automatic repeat request (ARQ). At the receiving end, FEC technology is used to correct a part of all errors that can be corrected. Through HARQ, the receiving end determines data packets that cannot be corrected by error detection, discards the data packets that cannot be corrected, and requests the transmitting end to resend the same data packets.

In the 5G New Radio (NR) protocol, for each PDSCH carrying unicast downlink data sent by a base station to a terminal (such as UE), each PDSCH corresponds to 1 TB without using space division multiplexing, and one PDSCH can correspond to 2 TBs when space division multiplexing is used. If a spatial bundling feedback mode is not used, the UE needs to feed back HARQ acknowledgement (HARQ-ACK) information to the base station for each TB. The HARQ-ACK information includes two states of ACK/NACK, in which ACK indicates that the UE demodulates the TB correctly, and NACK indicates that the UE demodulates the TB incorrectly. The base station uses the received HARQ-ACK information to determine whether to retransmit the erroneous TB.

Each TB will contain N CBGs. The value of N can be configured by the base station for the UE, and options are N=2/4/6/8. Each CBG contains one or more code blocks (CBs), and the number of CBs contained in each CBG can be calculated according to the total number of CBs contained in the TB and the above-mentioned N value through the agreed method of the existing protocol. In the NR protocol in the related art, CB is the smallest unit of data demodulation. For example, a TB contains 8 CBs. When the UE receives and demodulates this TB, it will demodulate the 8 CBs (such as CB0~CB7) respectively. If only CB0 is demodulated incorrectly, and CB1 to CB7 are demodulated correctly, in this case, for this TB, the overall result is still a demodulation error. Therefore, for this TB, the UE needs to feed back NACK, and accordingly, the base station needs to retransmit the entire TB after receiving the NACK.

The HARQ-ACK feedback method described above may be referred to as TB-level feedback. The UE only feeds back 1 bit of HARQ-ACK information for each TB. The main disadvantage is that if part of the CBs in a TB is demodulated incorrectly, the base station needs to retransmit the entire TB, resulting in a large resource overhead of retransmission of the base station. In response to this situation, a CBG-level retransmission method is added to the NR protocol, that is, the UE feeds back 1 bit for each CBG, and the base station also retransmits in units of CBGs when retransmitting. Continuing to take the above example as an example, assuming that the number of CBGs in the TB is N=4, then every 2 consecutive CBs constitute a CBG, and the UE feeds back 1 bit for each CBG when performing HARQ feedback. For one TB, the UE needs to feed back 4 bits in total. For example, the 4 bits fed back are 0111 (where 0 means NACK and 1 means ACK). After the base station receives the 4-bit feedback, it can determine that CBG1 (including CB0/1) is not correctly demodulated, and CBG2~CGB4 are correctly demodulated. At this time, only CBG1 needs to be retransmitted, but for CBG2/3/4, retransmission will not be performed. Through the CBG-level feedback, the resource overhead when the base station retransmits data can be greatly reduced.

In the NR system, the UE can multiplex the HARQ-ACK information of multiple TBs to form a HARQ-ACK codebook. For example, assuming that the PDSCH contains 7 TBs, when the UE performs HARQ feedback, the HARQ-ACK information of the 7 TBs can be multiplexed into a HARQ-ACK codebook. If the UE uses TB-level feedback, the size of the HARQ-ACK codebook is 7 bits, and 1 bit corresponds to one TB. If the UE uses CBG-level feedback, and each TB contains 4 CBGs, then the size of the above HARQ-ACK codebook is 7*4b=28 bit.

It can also be seen from the above example that a problem of CBG-level feedback is that the size of the HARQ-ACK codebook when the UE adopts CBG-level feedback is relatively large. Assuming that a HARQ-ACK codebook contains HARQ-ACK feedback of M TBs, if the TB-level feedback method is adopted, only M bits is required, but if the CBG-level feedback method is adopted, M*N bits are required.

In order to reduce the size of the CBG codebook, a scheme of dividing HARQ-ACK feedback into TB-level feedback and CBG-level feedback is proposed in the related art, that is, when the UE performs HARQ feedback, only for the TB whose TB-level feedback is NACK, its CBG-level feedback will be attached, and for the TB whose TB-level feedback is ACK, the CBG-level feedback will not be attached, which can reduce the size of the HARQ-ACK codebook.

For example, in the case of non-spatial division multiplexing, one TB contains 8 CBGs, and a certain HARQ-ACK codebook contains feedback for 10 TBs. Before demodulating the HARQ-ACK codebook, the base station can determine that the number of bits of the TB-level feedback is 10 bits, but the base station cannot determine the number of bits of the CBG-level feedback. Since the CBG-level feedback is only for the TB whose TB-level feedback is NACK, if one of the 10 TBs has NACK feedback, then the number of bits of the CBG-level feedback is 8 bits, that is, the total number of bits in the HARQ-ACK codebook is 18; if 2 in the 10 TBs have NACK feedback, then the number of bits of the CBG-level feedback is 16 bits, and the total number of bits in the HARQ-ACK codebook is 26. That is to say, the total number of bits of the HARQ-ACK codebook depends on the actual situation of the UE demodulating the PDSCH, and the base station cannot know this situation in advance. If the base station hopes to restore the source bits before channel coding after receiving the channel-coded bits, the base station needs to know the number of source bits before coding, or can try out the correct source bits after a few attempts. However, since the base station cannot predict the size of the HARQ-ACK codebook in advance, the base station will be unable to effectively demodulate or even demodulate the HARQ-ACK information, resulting in poor transmission effect of the HARQ-ACK information.

However, various embodiments involved in the present disclosure show a scheme of how the base station obtains the number of bits of the CBG-level feedback and accurately receives the HARQ-ACK information when the TB-level feedback and the CBG-level feedback are used in combination.

FIG. 1 is a schematic diagram of an implementation environment involved in a method for transmitting HARQ-ACK information according to some example embodiments. As shown in FIG. 1, the implementation environment may include several terminals 110 and base stations 120.

The terminal 110 is a wireless communication device that supports multiple wireless access technologies. For example, the terminal 110 may support cellular mobile communication technology, for example, may support the fifth generation mobile communication technology. Alternatively, the terminal 110 may also support a next-generation mobile communication technology of the 5G technology.

For example, the terminal 110 may also be a user terminal device such as a mobile phone (or "cellular" phone) and a computer with a mobile terminal, such as a portable, pocket-sized, hand-held, computer-built-in or vehicle-mounted mobile device, for example, Station (STA), subscriber unit, subscriber station, mobile station, mobile, remote station, access point, remote terminal, access terminal, user terminal, user agent, user device, or user equipment (UE). Specifically, for example, the terminal 110 may be a mobile terminal such as a smartphone, a tablet computer, and an e-book reader, or may be a smart wearable device such as smart glasses, a smart watch, or a smart bracelet.

Alternatively, the terminal 110 may be an in-vehicle communication device, for example, a trip computer with a wireless communication function, or a wireless communication device connected to an external trip computer.

Alternatively, the terminal 110 may also be a roadside device, for example, a streetlight, a signal light or other roadside device with a wireless communication function.

The base station 120 may be a network-side device in a wireless communication system. The wireless communication system may also be a 5G system, also known as a new air (NR) system. Alternatively, the wireless communication system may also be a next-generation system of the 5G system.

The base station 120 may be a gNB that adopts a centralized-distributed architecture in a 5G system. When the base station 120 adopts the centralized-distributed architecture, it usually includes a central unit (CU) and at least two distributed units (DUs). The central unit is provided with protocol stacks of a Packet Data Convergence Protocol (PDCP) layer, a Radio Link Control (RLC) layer, and a Media Access Control (MAC) layer; distribution. The distributed unit is provided with a protocol stack of a physical (PHY) layer. A specific implementation of the base station 120 is not limited in embodiments of the present disclosure.

A wireless connection can be established between the base station 120 and the terminal 110 through a wireless air interface. The wireless air interface is a wireless air interface based on the fifth generation mobile communication network technology (5G) standard, for example, the wireless air interface is a new air interface; or, the wireless air interface may also be a wireless air interface based on a next-generation mobile communication network technology standard of 5G.

In some embodiments, the above wireless communication system may further include a network management device 130.

Several base stations 120 are respectively connected to the network management device 130. The network management device 130 may be a core network device in the wireless communication system. For example, the network management device 130 may be a Mobility Management Entity (MME) in an Evolved Packet Core (EPC) network. Alternatively, the network management device may also be other core network devices, such as a serving gateway (SGW), a public data network gateway (PGW), a policy and charging rules function (PCRF) unit or Home Subscriber Server (HSS), etc. The implementation form of the network management device 130 is not limited in embodiments of the present disclosure.

Figure 2:
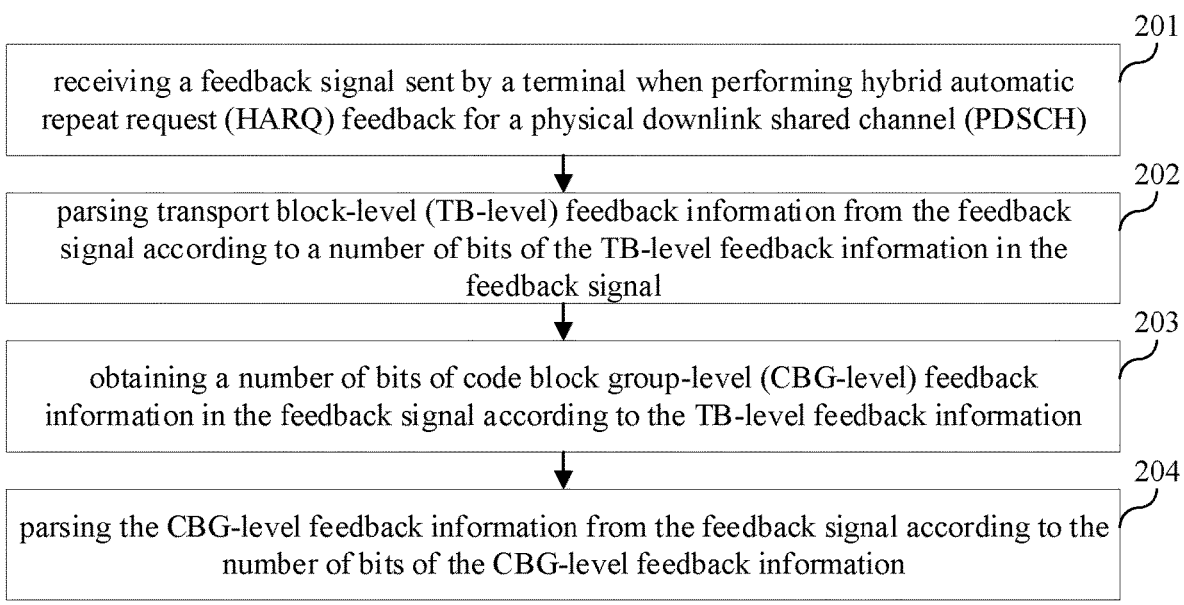
FIG. 2 is a flowchart of a method for transmitting HARQ acknowledgement information according to an embodiment.

FIG. 2 is a flowchart illustrating a method for transmitting HARQ-ACK information according to an embodiment. The method for transmitting HARQ-ACK information may be performed by a base station. For example, the base station may be the base station 120 in the implementation environment shown in FIG. 1. As shown in FIG. 2, the method may include the following steps.

In step 201, a feedback signal sent by a terminal when HARQ feedback is performed for a physical downlink shared channel (PDSCH) is received.

In step 202, transport block-level (TB-level) feedback information is parsed from the feedback signal according to a number of bits of the TB-level feedback information in the feedback signal, where the TB-level feedback information includes a reception result of the terminal for each TB contained in the PDSCH.

In step 203, a number of bits of code block group-level (CBG-level) feedback information in the feedback signal is obtained according to the TB-level feedback information.

In step 204, the CBG-level feedback information is parsed from the feedback signal according to the number of bits of the CBG-level feedback information. The CBG-level feedback information includes a reception result of the terminal for each CBG in the TB that fails to be received on the PDSCH.

The TB-level feedback information and the CBG-level feedback information are sent by the terminal after independent channel coding.

In a possible implementation, before parsing the TB-level feedback information from the feedback signal according to the number of bits of the TB-level feedback information in the feedback signal, the method further includes:

obtaining a number of TBs contained in the PDSCH;
obtaining the number of bits of the TB-level feedback information according to the number of TBs contained in the PDSCH.

In a possible implementation, obtaining the number of bits of the CBG-level feedback information in the feedback signal according to the TB-level feedback information includes:

obtaining the number of TBs that the terminal fails to receive on the PDSCH according to the TB-level feedback information;
obtaining the number of bits of the CBG-level feedback information according to the number of TBs that the terminal fails to receive on the PDSCH.

In a possible implementation, the TB-level feedback information is a first sequence of n bits, n is the number of TBs included in the PDSCH, and respective bits in the first sequence are in a one-to-one correspondence with respective TBs in the PDSCH; a bit value in the first sequence corresponding to the TB that the terminal fails to receive on the PDSCH is 0;

obtaining the number of TBs that the terminal fails to receive on the PDSCH according to the TB-level feedback information, includes:

obtaining the number m of bits whose value is 0 in the first sequence as the number of TBs that the terminal fails to receive on the PDSCH.

In a possible implementation, obtaining the number of bits of the CBG-level feedback information according to the number of TBs that the terminal fails to receive on the PDSCH, includes:

obtaining the number of bits of the CBG-level feedback information by multiplying the number m of bits with a value of 0 in the first sequence by the number k of CBGs contained in each TB.

In a possible implementation, parsing the CBG-level feedback information from the feedback signal according to the number of bits of the CBG-level feedback information, includes:

obtaining a second sequence including m*k bits by parsing from the feedback signal;
obtaining the second sequence as the CBG-level feedback information.

In a possible implementation, the method further includes:

dividing the second sequence into m subsequences according to an order of bits in the sequence from front to back, in which the m subsequences are in a one-to-one correspondence with the TBs that the terminal fails to receive on the PDSCH.

In a possible implementation, parsing the CBG-level feedback information from the feedback signal according to the number of bits of the CBG-level feedback information, includes:

when the number of bits of the CBG-level feedback information is not 0, parsing the CBG-level feedback information from the feedback signal according to the number of bits of the CBG-level feedback information.

In a possible implementation, receiving the feedback signal sent by the terminal on HARQ feedback resource corresponding to the PDSCH includes:

determining the HARQ feedback resource corresponding to the PDSCH;
receiving the feedback signal on the HARQ feedback resource.

In conclusion, in the solutions provided by embodiments of the present disclosure, when the terminal performs TB-level and CBG-level HARQ feedback on the PDSCH, the CBG-level feedback information includes the receiving result of the terminal for each CBG in the TB that fails to be received on the PDSCH, and the TB-level feedback information and the CBG-level feedback information are independently encoded and sent. When receiving HARQ feedback, the base station first parses the TB-level feedback information according to the known number of bits of the TB-level feedback information, and then obtains the number of bits of the CBG-level feedback information according to the parsed TB-level feedback information, and then parses the CBG-level feedback information according to the number of bits of the CBG-level feedback information, so that when the terminal uses the TB-level feedback and the CBG-level feedback in combination, the base station can accurately parse the HARQ feedback information, which improves the transmission effect of HARQ-ACK information while saving HARQ feedback resources.

Figure 3:
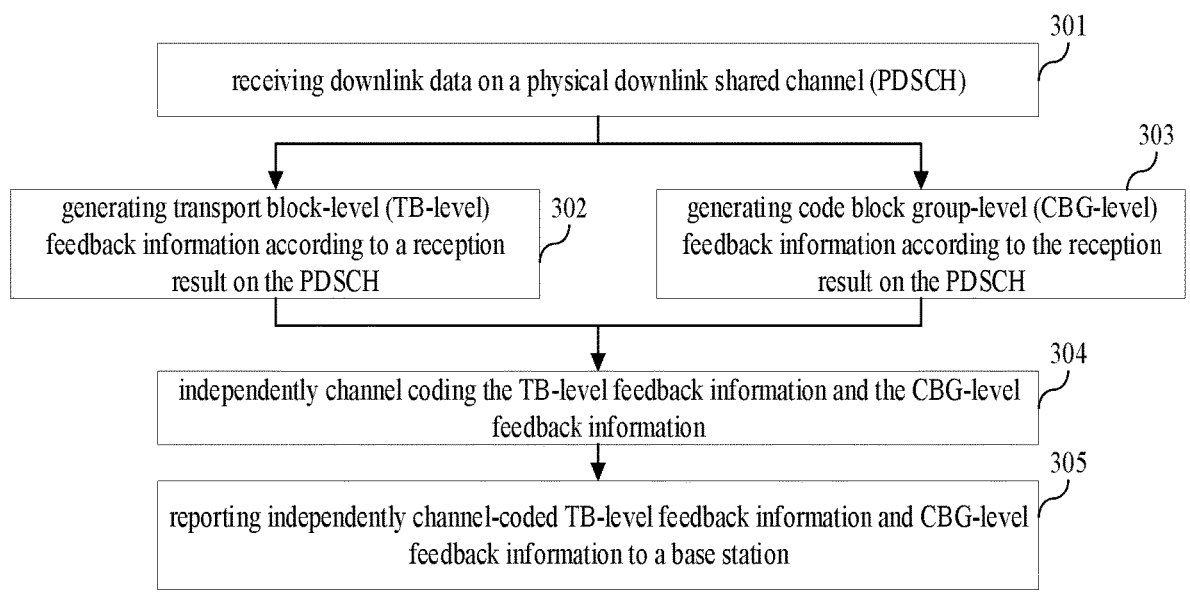
FIG. 3 is a flowchart of a method for transmitting HARQ acknowledgement information according to an embodiment.

FIG. 3 is a flowchart showing a method for transmitting HARQ-ACK information according to an embodiment. The method for transmitting HARQ-ACK information may be performed by a terminal. For example, the terminal may be the terminal 110 in the implementation environment shown in FIG. 1. As shown in FIG. 3, the method may include the following steps.

In step 301, downlink data is received on a physical downlink shared channel (PDSCH).

In step 302, transport block-level (TB-level) feedback information is generated according to a reception result on the PDSCH, in which the TB-level feedback information includes a reception result of the terminal for each TB included in the PDSCH.

In step 303, code block group-level (CBG-level) feedback information is generated according to a reception result on the PDSCH, in which the CBG-level feedback information includes a reception result of the terminal for each CBG in the TB that fails to be received on the PDSCH.

In step 304, channel coding is performed independently on the TB-level feedback information and the CBG-level feedback information.

In step 305, the independently channel-coded TB-level feedback information and CBG-level feedback information are reported to a base station.

In a possible implementation, the TB-level feedback information is a first sequence of n bits, n is a number of TBs included in the PDSCH, and respective bits in the first sequence are in a one-to-one correspondence with respective TBs in the PDSCH.

In a possible implementation, a bit value in the first sequence corresponding to the TB that the terminal fails to receive on the PDSCH is 0; the CBG level feedback information is a second sequence of m*k bits; m is a number of bits with a value of 0 in the first sequence, and k is a number of CBGs contained in each TB.

Generating the CBG-level feedback information according to the reception result on the PDSCH includes:

generating k-bit subsequences corresponding to TBs that the terminal fails to receive on the PDSCH according to the reception result on the PDSCH;

obtaining the second sequence by connecting the k-bit subsequences corresponding to the TBs that the terminal fails to receive on the PDSCH end to end.

In a possible implementation, reporting the independently channel-coded TB-level feedback information and CBG-level feedback information to the base station, includes:

determining HARQ feedback resource corresponding to the PDSCH;

sending the independently channel-coded TB-level feedback information and CBG-level feedback information on the HARQ feedback resource.

In conclusion, in the solutions provided by embodiments of the present disclosure, when the terminal performs TB-level and CBG-level HARQ feedback on the PDSCH, the CBG-level feedback information includes the reception result of the terminal for each CBG in the TB that fails to be received on the PDSCH, and the TB-level feedback information and the CBG-level feedback information are independently encoded and sent, so that when the base station receives the HARQ feedback, it first parses the TB-level feedback information according to the known number of bits of the TB-level feedback information, and then obtains the number of bits of the CBG-level feedback information according to the parsed TB-level feedback information, and then parses the CBG-level feedback information according to the number of bits of the CBG-level feedback information, so that when the terminal uses the TB-level feedback and the CBG-level feedback in combination, the base station can accurately parse the HARQ feedback information, improving the transmission effect of HARQ-ACK information while saving HARQ feedback resources.

Figure 4:
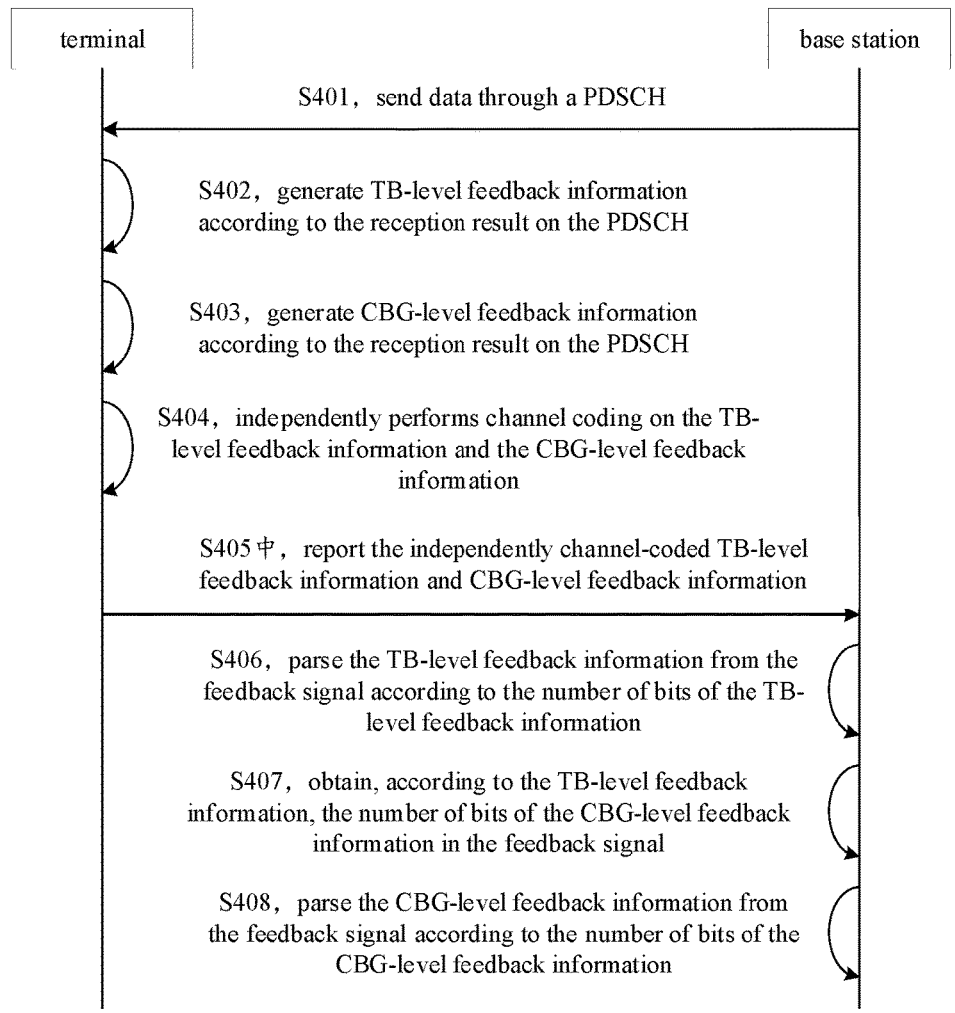
FIG. 4 is a flowchart of a method for transmitting HARQ acknowledgement information according to an embodiment.

FIG. 4 is a flowchart of a method for transmitting HARQ-ACK information according to an embodiment. The method for transmitting HARQ-ACK information may be performed by a terminal and a base station interactively. For example, the terminal may be the terminal 110 in the implementation environment shown in FIG. 1, and the base station may be the base station 120 in the implementation environment shown in FIG. 1. As shown in FIG. 4, the method may include the following steps.

In step 401, the base station sends data to the terminal through a physical downlink shared channel PDSCH, and correspondingly, the terminal receives downlink data on the PDSCH.

In embodiments of the present disclosure, when the base station transmits downlink data to the terminal, the terminal can receive the PDSCH on designated downlink resource, and receive and demodulate the data in the PDSCH.

For each CBG in each TB in the PDSCH, if the terminal successfully demodulates the data carried by each CB in the CBG, it is determined that the CBG is received successfully; otherwise, if the terminal fails to successfully demodulate the data carried in each CB of the CBG (for example, some or all of the CBs fail to be demodulated), it is determined that the reception of the CBG fails, and the base station needs to retransmit the CBG.

Correspondingly, for each TB in the PDSCH, if the terminal successfully receives each CBG in the TB, it is determined that the reception of the TB is successful; otherwise, if the terminal fails to demodulate any CBG in the TB successfully, for example, fails to receive part or all of the CBG, it is determined that the TB fails to be received.

In step 402, the terminal generates TB-level feedback information according to the reception result on the PDSCH.

The TB-level feedback information includes the reception result of the terminal for each TB included in the PDSCH.

In embodiments of the present disclosure, the terminal may generate the TB-level feedback information according to whether each TB in the PDSCH is successfully received.

The TB-level feedback information is a first sequence of n bits, where n is the number of TBs included in the PDSCH, and respective bits in the first sequence are in a one-to-one correspondence with respective TBs in the PDSCH.

In some embodiments, the bit value in the first sequence corresponding to the TB that the terminal fails to receive on the PDSCH is 0.

In some embodiments, the bit value in the first sequence corresponding to the TB successfully received by the terminal on the PDSCH is 1.

The TB-level feedback information may be a 0-1 sequence whose length is equal to the number of TBs in the PDSCH. In addition, the order of the TBs in the PDSCH is the same as the order of the bits corresponding to the reception results of the TBs in the PDSCH in the first sequence.

For example, assuming that the above PDSCH contains 7 TBs, and the first and third TBs fail to be received, the terminal can generate a TB-level feedback sequence of 0-1 sequence of 7 bits: 0101111.

In step 403, the terminal generates CBG-level feedback information according to the reception result on the PDSCH.

The CBG-level feedback information includes the reception result of the terminal for each CBG in the TB that fails to be received on the PDSCH.

In some embodiments, the CBG-level feedback information is a second sequence of m*k bits; m is the number of bits whose value is 0 in the first sequence, and k is the number of CBGs included in each TB. When generating the CBG-level feedback information according to the reception result on the PDSCH, the terminal may generate k-bit subsequences corresponding to the TBs that the terminal fails to receive on the PDSCH according to the reception result on the PDSCH, and obtain the second sequence by connecting end to end the k-bit subsequences corresponding to the TBs that the terminal fails to receive on the PDSCH.

In a possible implementation, the order in which the subsequences corresponding to the TBs that the terminal fails to receive on the PDSCH are connected is the same as the order of these TBs in the PDSCH.

For example, assuming that each TB contains 4 CBGs, and assuming that the above PDSCH contains 7 TBs, and the TB-level feedback sequence generated by the terminal is: 0101111, where the 4-bit subsequence corresponding to the first TB is: 0111, which indicates that the terminal fails to receive the first CBG in the first TB, and receives the other three CBGs successfully; and the 4-bit subsequence corresponding to the third TB is: 1010, which indicates that the terminal fails to receive the second and fourth CBGs in the third TB, and receives the other two CBGs successfully, then according to the order of the first TB and the third TB in the PDSCH, the terminal can splice the subsequence corresponding to the third TB after the subsequence corresponding to the first TB, to obtain the second sequence as: 01111010.

In step 404, the terminal independently performs channel coding on the TB-level feedback information and the CBG-level feedback information.

In embodiments of the present disclosure, the terminal may separately encode the TB-level feedback information (i.e., the first sequence of 7 bits) according to the uplink control information (UCI) encoding regulations in the 5G NR protocol, for example, adding Cyclic Redundancy Check (CRC), using polar channel coding, etc.

Correspondingly, the terminal may also separately encode the CBG-level feedback information (i.e., the second sequence of 8 bits) according to the UCI encoding regulations in the 5G NR protocol.

In step 405, the terminal reports the independently channel-coded TB-level feedback information and CBG-level feedback information to the base station; correspondingly, the base station receives the feedback signal sent when the terminal performs HARQ feedback on PDSCH.

In some embodiments, the terminal may determine the HARQ feedback resource corresponding to the PDSCH; and send the independently channel-coded TB-level feedback information and CBG-level feedback information on the HARQ feedback resource.

For example, in embodiments of the present disclosure, the terminal may independently modulate the encoded TB-level feedback information and CBG-level feedback information into duplicate symbols, and then map them to the resource designated by the base station for transmitting HARQ-ACK information (that is, the HARQ feedback resource). The resource for transmitting HARQ-ACK information may be a physical uplink control channel (PUCCH) resource, or may be a physical uplink shared channel (PUSCH) resource.

Correspondingly, the base station may determine the HARQ feedback resource corresponding to the PDSCH, and receive the feedback signal on the HARQ feedback resource.

After sending the PDSCH, the base station may monitor on the resource on which the terminal performs HARQ feedback on the PDSCH, so as to receive the feedback signal on the resource on which the terminal performs HARQ feedback on the PDSCH.

The base station stores the feedback signal received on the HARQ feedback resource, and parses the TB-level feedback information and CBG-level feedback information from the received feedback signal through subsequent analysis steps.

In a possible implementation, when the terminal successfully receives all TBs in the above PDSCH, the CBG-level feedback information may not be generated, and accordingly, the terminal only encodes and transmits the TB-level feedback information.

In step 406, the base station parses the TB-level feedback information from the feedback signal according to the number of bits of the TB-level feedback information in the feedback signal, where the TB-level feedback information includes the reception result of the terminal for each TB included in the PDSCH.

The base station may know in advance the number of bits of the TB-level feedback information fed back by the terminal.

In a possible implementation, the number of bits of the TB-level feedback information may be preset in the base station, and when parsing the TB-level feedback information, the base station may directly read the number of bits of the TB-level feedback information.

In another possible implementation, the base station may also directly obtain the number of TBs included in the PDSCH, and obtain the number of bits of the TB-level feedback information according to the number of TBs included in the PDSCH.

For example, when one bit is used for HARQ feedback for each TB in the TB-level feedback information, the base station directly obtains the number of TBs included in the PDSCH as the number of bits of the TB-level feedback information.

After obtaining the number of bits of the TB-level feedback information, the base station can parse out the TB-level feedback information from the received feedback information according to the number of bits of the TB-level feedback information.

In step 407, the base station obtains, according to the TB-level feedback information, the number of bits of the CBG-level feedback information in the feedback signal.

In some embodiments, the base station may obtain the number of TBs that the terminal fails to receive on the PDSCH according to the TB-level feedback information, and obtain the number of bits of the CBG-level feedback information according to the number of TBs that the terminal fails to receive on the PDSCH.

After the base station parses and obtains the TB-level feedback information, it can know which TBs in the PDSCH are successfully received by the terminal and which TBs are unsuccessfully received by the terminal, and the number of bits of the CBG-level feedback information is related to the TBs that the terminal fails to receive. Therefore, the base station can determine the number of bits of the CBG-level feedback information according to the number of TBs that the terminal fails to receive.

In some embodiments, the base station may obtain the number m of bits with a value of 0 in the first sequence (that is, the foregoing TB-level feedback information) as the number of TBs that the terminal fails to receive on the PDSCH.

Since the TB that the terminal fails to receive on the PDSCH corresponds to the bit value 0 in the first sequence (that is, the TB-level feedback information), the base station can directly take the number of bits in the first sequence whose value is 0 as the number of TBs that the terminal fails to receive on the PDSCH.

In some embodiments, when obtaining the number of bits of the CBG-level feedback information according to the number of TBs that the terminal fails to receive on the PDSCH, the base station may multiply the number m of bits with a value of 0 in the first sequence by the number k of CBGs contained in each TB, to obtain the number of bits of the CBG-level feedback information.

For example, assuming that each TB contains 4 CBGs, the above PDSCH contains 7 TBs, and the TB-level feedback sequence (i.e., the first sequence) obtained by the base station through parsing is: 0101111 as an example, after the base station parses the first sequence, to determine that the first and third positions in the sequence are 0, that is, the value of m is 2, and the value of k is 4, then the base station can determine that the number of bits of the CBG-level feedback information is 8.

In step 408, the base station parses the CBG-level feedback information from the feedback signal according to the number of bits of the CBG-level feedback information, in which the CBG-level feedback information includes the reception result of the terminal for each CBG in the TB that fails to be received on the PDSCH.

In some embodiments, the base station may obtain a second sequence including m*k bits by parsing the feedback signal, and obtain the second sequence as the CBG-level feedback information.

After obtaining the number of bits of the CBG-level feedback information, the base station can parse out the CBG-level feedback information from the received feedback information according to the number of bits of the CBG-level feedback information.

In some embodiments, after obtaining the second sequence, the base station may further divide the second sequence into m subsequences according to the order of bits in the sequence from front to back. The m subsequences are in a one-to-one correspondence with the TBs that the terminal fails to receive on the PDSCH.

Since the second sequence may be a long sequence including subsequences of multiple TBs, after the base station obtains the second sequence, the base station also needs to determine the subsequence of each TB to determine which CBGs require retransmission and which CBGs do not require retransmission in each TB that the terminal fails to receive.

When the terminal generates the CBG-level feedback information (that is, the second sequence), the subsequences of the TBs that the terminal fails to receive are connected end to end according to the order of the corresponding TBs in the PDSCH. Correspondingly, the base station can also follow the bit order, and divide the second sequence obtained by parsing into m subsequences.

For example, still taking each TB contain 4 CBGs, the above PDSCH contains 7 TBs, and the TB-level feedback sequence (i.e., the first sequence) obtained by the base station through parsing is 0101111 as an example, the base station determines that the number of bits of the CBG-level feedback information is 8 based on the number of 0 in the first sequence, and obtains the second sequence as 01111010 by parsing the feedback signal. Subsequently, the base station further divides the second sequence into two subsequences of 0111 and 1010, and can determine that the subsequence 0111 is the subsequence of the first TB in the PDSCH, and indicates that the first CBG in the first TB needs to be retransmitted; correspondingly, the base station can also determine that the subsequence 1010 is the subsequence of the third TB in the PDSCH, and indicates that the second and fourth CBGs in the third TB need to be retransmitted.

In some embodiments, after obtaining the number of bits of the CBG-level feedback information, the base station can determine whether the number of bits of the CBG-level feedback information is 0, and when the number of bits of the CBG-level feedback information is not 0, the base station can determine that there is CBG-level feedback information, and at this time, the base station can parse the CBG-level feedback information from the feedback signal according to the number of bits of the CBG-level feedback information.

Correspondingly, if the number of bits of the CBG-level feedback information is 0, the base station can determine that there is no CBG-level feedback information, that is, no CBG needs to be retransmitted. At this time, the base station does not need to continue parsing the CBG-level feedback information.

In conclusion, in the solutions provided by embodiments of the present disclosure, when the terminal performs TB-level and CBG-level HARQ feedback on the PDSCH, the CBG-level feedback information includes the reception result of the terminal for each CBG in the TB that fails to be received on the PDSCH, and the TB-level feedback information and the CBG-level feedback information are independently encoded and sent. When receiving HARQ feedback, the base station first parses the TB-level feedback information according to the known number of bits of the TB-level feedback information, and then obtains the number of bits of the CBG-level feedback information according to the parsed TB-level feedback information, and then parses the CBG-level feedback information according to the number of bits of the CBG-level feedback information, so that when the terminal uses the TB-level feedback and the CBG-level feedback in combination, the base station can accurately parse the HARQ feedback information, improving the transmission effect of HARQ-ACK information while saving HARQ feedback resources.

Through the solutions shown in the foregoing embodiments of the present disclosure, the terminal divides the feedback in the HARQ-ACK codebook into TB-level feedback and CBG-level feedback. The number of bits of the TB-level feedback information and the number of bits of the CBG-level feedback information are independently channel-coded, and the number of bits of the CBG-level feedback information can be determined by the base station according to the TB-level feedback information. For the TB-level feedback information, each TB uses 1 bit to represent HARQ-ACK information. Only for the TB whose TB-level feedback information is NACK, CBG-level feedback information will be added, that is to say, the number of bits of CBG-level feedback information is determined by then number of NACKs in the TB-level feedback information. If the number of TBs with NACK is large, the number of bits of the CBG feedback information is large. On the contrary, if the number of TBs with NACK is small, the number of bits of the CBG feedback information is small.

After demodulating the TB-level feedback information, the base station can determine the number of bits of the CBG-level feedback information according to the number of NACKs in the TB-level feedback information, so as to further demodulate the correct CBG-level feedback information.

Figure 5:
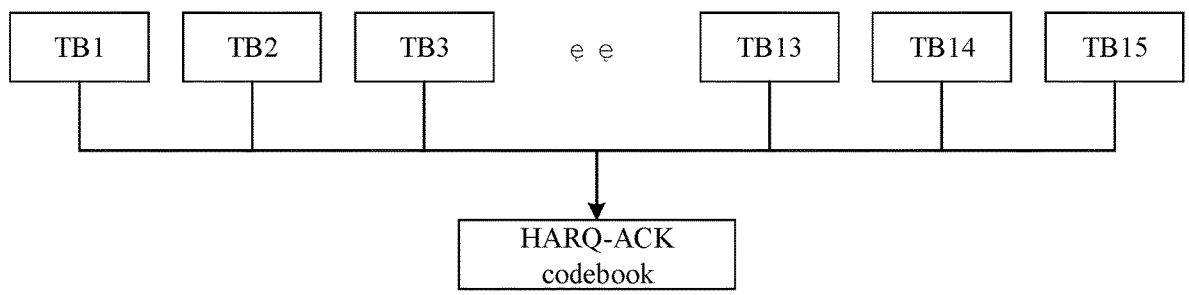
FIG. 5 is a schematic diagram showing a structure of a TB of PDSCH according to an embodiment.

For example, please refer to FIG. 5, which shows a schematic diagram of a structure of a TB of a PDSCH involved in an embodiment of the present disclosure. As shown in FIG. 5, the base station schedules 15 PDSCHs, the HARQ-ACK information corresponding to these PDSCHs is multiplexed into a HARQ-ACK codebook, and each PDSCH corresponds to 1 TB.

In one case, it is assumed that for these 15 TBs, the demodulation results of the terminal are shown in Table 1 below.

TABLE 1

| TB1 | TB2 | TB3 | TB4 | TB5 | TB6 | TB7 | TB8 |
|-----|-----|-----|-----|-----|-----|-----|-----|
| ACK | ACK | NACK | ACK | ACK | ACK | ACK | ACK |
| TB9 | TB10 | TB11 | TB12 | TB13 | TB14 | TB15 | |
| ACK | ACK | ACK | ACK | ACK | NACK | ACK | |

It can be seen from Table 1 that a total of 2 TB demodulation results are NACK. Then the HARQ-ACK information fed back at the TB level has a total of 15 bits, which is 110111111111101. Among them, CBG-level feedback information will be attached for TB3 and TB14. Assume that among the 4 CBGs (0~3) included in TB3, CBG2 is demodulated incorrectly, and other CBGs are demodulated correctly. Among the 4 CBGs (0~3) included in TB14, the demodulation of CBG1/2 is wrong, and the demodulation of CBG3/4 is correct. Then, the CBG-level feedback information is concatenated in the order of the TB index for a total of 8 bits, which is 10110011.

The terminal will encode the 15-bit TB-level feedback information separately. The coding process is as specified in the current 5G NR protocol for UCI coding, that is, CRC needs to be added, polar channel coding is used, and so on. In addition, the UE encodes the 8-bit CBG-level feedback information separately, and the encoding process is as specified for UCI encoding in the current 5G NR protocol. The terminal modulates the encoded TB-level feedback information and the encoded CBG-level feedback information separately into duplicate symbols and maps them to the resource designated by the base station for transmitting HARQ-ACK information. The resource for transmitting HARQ-ACK information may be a PUCCH resource or a PUSCH resource.

After receiving the HARQ-ACK feedback information sent by the terminal, the base station first decodes the TB-level feedback information from the received encoded HARQ-ACK feedback information according to the number of bits of the TB-level feedback information. At this time, the base station will obtain 15 bits of TB-level feedback information, which is 110111111111101. According to the number of NACKs in the TB-level feedback information, that is, 2, the base station calculates that the number of bits of the CBG-level feedback information is 2*4=8 bits. The base station decodes the 8-bit CBG-level feedback information from the received coded HARQ-ACK feedback information according to the number of bits of the CBG-level feedback information, which is 10110011.

In another case, it is assumed that for these 15 TBs, the demodulation results of the terminal are shown in Table 2 below.

TABLE 2

| TB1 | TB2 | TB3 | TB4 | TB5 | TB6 | TB7 | TB8 |
|-----|-----|-----|-----|-----|-----|-----|-----|
| ACK | ACK | ACK | ACK | ACK | ACK | ACK | ACK |
| TB9 | TB10 | TB11 | TB12 | TB13 | TB14 | TB15 | |
| ACK | ACK | ACK | ACK | ACK | ACK | ACK | |

As can be seen from Table 2, all TB demodulation results are ACK. At this time, there will be no CBG-level feedback information. The HARQ-ACK information fed back at the TB level is 15 bits in total, which is 111111111111111.

The terminal will encode the 15-bit TB-level feedback information. The encoding process is as specified in the current 5G NR protocol for UCI coding, that is, CRC needs to be added, polar channel coding is used, etc., and after the terminal modulates the coded TB-level feedback information into duplicate symbols, the terminal maps them to the resource designated by the base station for transmitting the HARQ-ACK information. The resource for transmitting HARQ-ACK information may be a PUCCH resource or a PUSCH resource.

After receiving the HARQ-ACK feedback information sent by the terminal, the base station first decodes the TB-level feedback information from the received encoded HARQ-ACK feedback information according to the number of bits of the TB-level feedback information. At this time, the base station will obtain TB-level feedback information as 15 bits, specifically 111111111111111. According to the number of NACKs in the TB-level feedback, that is, 0, the base station determines that there is no CBG-level feedback information in the current HARQ-ACK feedback information.

The following are the apparatus embodiments of the present disclosure, which can be configured to implement the method embodiments of the present disclosure. For details not disclosed in the apparatus embodiments of the present disclosure, please refer to the method embodiments of the present disclosure.

Figure 6:
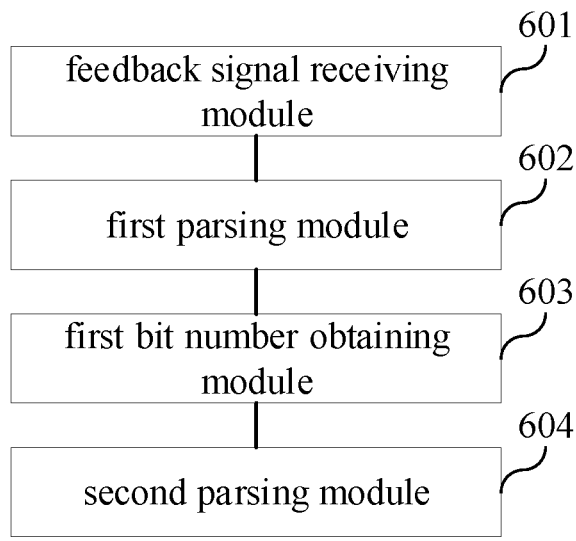
FIG. 6 is a block diagram of an apparatus for transmitting HARQ acknowledgement information according to an embodiment.

FIG. 6 is a block diagram of an apparatus for transmitting hybrid automatic repeat request acknowledgement information according to an embodiment. As shown in FIG. 6, the apparatus for transmitting hybrid automatic repeat request acknowledgement information can be implemented as all or part of the base station 120 in the implementation environment shown in FIG. 1 in a form of hardware or a combination of software and hardware, to perform the steps performed by the base station in the embodiment shown in FIG. 2 or FIG. 4. The apparatus for transmitting hybrid automatic repeat request acknowledgement information may include a feedback signal receiving module 601, a first parsing module 602, a first bit number obtaining module 603, and a second parsing module 604.

The feedback signal receiving module 601 is configured to receive a feedback signal sent by a terminal when performing hybrid automatic repeat request (HARD) feedback for a physical downlink shared channel (PDSCH).

The first parsing module 602 is configured to parse transport block-level (TB-level) feedback information from the feedback signal according to a number of bits of the TB-level feedback information in the feedback signal, wherein the TB-level feedback information includes a reception result of the terminal for each TB contained in the PDSCH.

The first bit number obtaining module 603 is configured to obtain a number of bits of code block group-level (CBG-level) feedback information in the feedback signal according to the TB-level feedback information.

The second parsing module 604 is configured to parse the CBG-level feedback information from the feedback signal according to the number of bits of the CBG-level feedback information, wherein the CBG-level feedback information includes a reception result of the terminal for each CBG in a TB that fails to be received on the PDSCH.

The TB-level feedback information and the CBG-level feedback information are sent by the terminal after independent channel coding.

In a possible implementation, the apparatus further includes:

a number obtaining module, configured to obtain a number of TBs contained in the PDSCH before the first parsing module parses the TB-level feedback information from the feedback signal according to the number of bits of the TB-level feedback information in the feedback signal;

a second bit number obtaining module, configured to obtain the number of bits of the TB-level feedback information according to the number of TBs contained in the PDSCH.

In a possible implementation, the second bit number obtaining module includes:

a number obtaining submodule, configured to obtain, according to the TB-level feedback information, a number of TBs that the terminal fails to receive on the PDSCH;

a bit number obtaining submodule, configured to obtain the number of bits of the CBG-level feedback information according to the number of TBs that the terminal fails to receive on the PDSCH.

In a possible implementation, the TB-level feedback information is a first sequence of n bits, n is a number of TBs contained in the PDSCH, and respective bits in the first sequence are in a one-to-one correspondence with respective TBs in the PDSCH; a bit value in the first sequence corresponding to the TB that the terminal fails to receive on the PDSCH is 0;

the number obtaining submodule is configured to obtain a number m of bits with a value of 0 in the first sequence as the number of TBs that the terminal fails to receive on the PDSCH.

In a possible implementation, the bit number obtaining submodule is configured to obtain the number of bits of the CBG-level feedback information by multiplying the number m of bits with a value of 0 in the first sequence by a number k of CBGs contained in each TB.

In a possible implementation, the second parsing module includes:

a sequence parsing submodule, configured to obtain a second sequence containing m*k bits by parsing from the feedback signal;

an information obtaining submodule, configured to obtain the second sequence as the CBG-level feedback information.

In a possible implementation, the apparatus further includes:

a dividing module, configured to divide the second sequence into m subsequences according to an order of bits in the sequence from front to back, wherein the m subsequences are in one-to-one correspondence with the TBs that the terminal fails to receive on the PDSCH.

In a possible implementation, the second parsing module is configured to, when the number of bits of the CBG-level feedback information is not 0, parse the CBG-level feedback information from the feedback signal according to the number of bits of the CBG-level feedback information.

In a possible implementation, the feedback signal receiving module includes:

a resource determining submodule, configured to determine HARQ feedback resource corresponding to the PDSCH;

a receiving submodule, configured to receive the feedback signal on the HARQ feedback resource.

Figure 7:
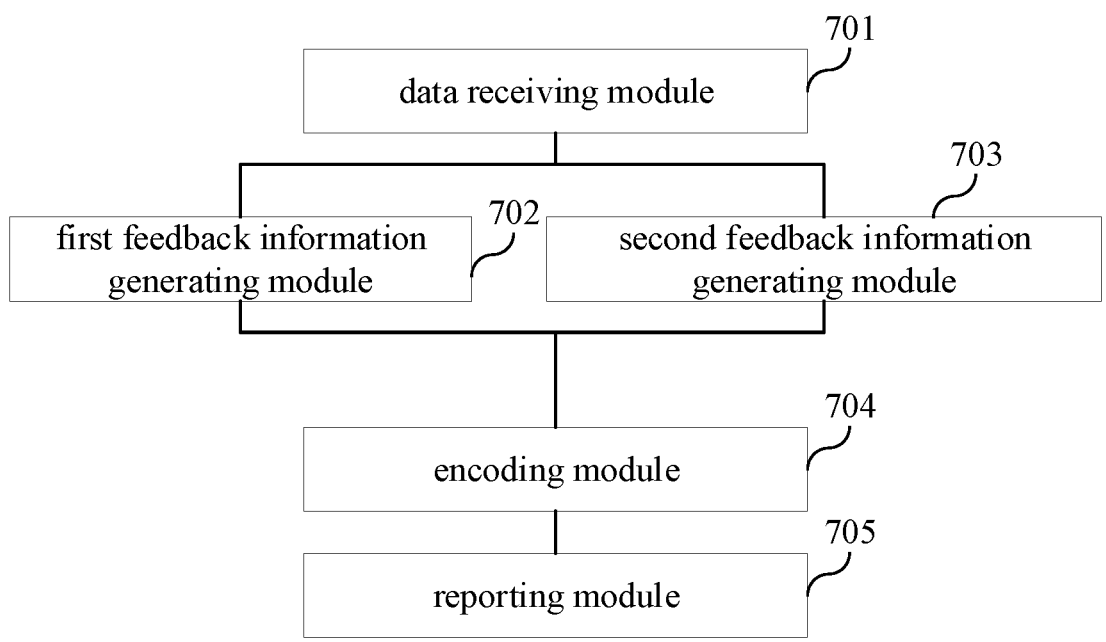
FIG. 7 is a block diagram of an apparatus for transmitting HARQ acknowledgement information according to an embodiment.

FIG. 7 is a block diagram of an apparatus for transmitting hybrid automatic repeat request acknowledgement information according to an embodiment. As shown in FIG. 7, the apparatus for transmitting hybrid automatic repeat request acknowledgement information may be implemented as all or part of the terminal 110 in the implementation environment shown in FIG. 1 in a form of hardware or a combination of software and hardware, to perform the steps performed by the terminal in the embodiment shown in FIG. 3 or FIG. 4. The apparatus for transmitting hybrid automatic repeat request acknowledgement information may include:

a data receiving module 701, configured to receive downlink data on a physical downlink shared channel (PDSCH);

a first feedback information generating module 702, configured to generate transport block-level (TB-level) feedback information according to a reception result on the PDSCH, wherein the TB-level feedback information includes a reception result of the terminal for each TB contained in the PDSCH;

a second feedback information generating module 703, configured to generate code block group-level (CBG-level) feedback information according to the reception result on the PDSCH, wherein the CBG-level feedback information includes a reception result of the terminal for each CBG in a TB that fails to be received on the PDSCH;

an encoding module 704, configured to independently channel code the TB-level feedback information and the CBG-level feedback information;

a reporting module 705, configured to report independently channel-coded TB-level feedback information and CBG-level feedback information to a base station.

In a possible implementation, the TB-level feedback information is a first sequence of n bits, n is a number of TBs contained in the PDSCH, and respective bits in the first sequence are in one-to-one correspondence with respective TBs in the PDSCH.

In a possible implementation, a bit value in the first sequence corresponding to the TB that the terminal fails to receive on the PDSCH is 0; the CBG-level feedback information is a second sequence of m*k bits; m is a number of bits with a value of 0 in the first sequence, and k is a number of CBGs contained in each TB;

the second feedback information generating module includes:

a subsequence generating submodule, configured to generate, according to the reception result on the PDSCH, a k-bit subsequence corresponding to each of the TBs that the terminal fails to receive on the PDSCH;

a splicing submodule, configured to obtain the second sequence by connecting end-to-end the k-bit subsequences corresponding to the TBs that the terminal fails to receive on the PDSCH.

In a possible implementation, the reporting module includes:

a resource determining submodule, configured to determine HARQ feedback resource corresponding to the PDSCH;

a sending submodule, configured to send the independently channel-coded TB-level feedback information and CBG-level feedback information on the HARQ feedback resource.

An embodiment of the present disclosure also provides a data transmission system. The system includes at least a terminal and a base station.

The base station includes the apparatus for transmitting hybrid automatic repeat request acknowledgement information provided by the embodiment shown in FIG. 6.

The terminal includes the apparatus for transmitting hybrid automatic repeat request acknowledgement information provided by the embodiment shown in FIG. 7.

It should be noted that, when the apparatus provided in the above embodiment realizes its functions, the division of the above functional modules is only used as an example for illustration. In practical applications, the above functions can be allocated to different functional modules according to actual needs. That is, the content structure of the apparatus is divided into different functional modules to complete all or part of the functions described above.

Regarding the apparatus in the above-mentioned embodiments, the specific manner in which each module performs operations has been described in detail in the embodiments of the method, and will not be described in detail here.

An embodiment of the present disclosure provides an apparatus for transmitting hybrid automatic repeat request acknowledgement information, which can implement all or part of the steps performed by the base station in the above-mentioned embodiment shown in FIG. 2 or FIG. 4 of the present disclosure. The apparatus for transmitting hybrid automatic repeat request acknowledgement information includes: a processor, and a memory configured to store instructions executable by the processor;

wherein the processor is configured to:
receive a feedback signal sent by a terminal when performing hybrid automatic repeat request (HARD) feedback for a physical downlink shared channel (PDSCH);
parse transport block-level (TB-level) feedback information from the feedback signal according to a number of bits of the TB-level feedback information in the feedback signal, wherein the TB-level feedback information includes a reception result of the terminal for each TB contained in the PDSCH;
obtain a number of bits of code block group-level (CBG-level) feedback information in the feedback signal according to the TB-level feedback information;
parse the CBG-level feedback information from the feedback signal according to the number of bits of the CBG-level feedback information, wherein the CBG-level feedback information includes a reception result of the terminal for each CBG in a TB that fails to be received on the PDSCH;
wherein, the TB-level feedback information and the CBG-level feedback information are sent by the terminal after independent channel coding.

An embodiment of the present disclosure provides an apparatus for transmitting hybrid automatic repeat request acknowledgement information, which can implement all or part of the steps performed by the terminal in the above-mentioned embodiment shown in FIG. 3 or FIG. 4 of the present disclosure. The apparatus for transmitting hybrid automatic repeat request acknowledgement information includes: a processor, and a memory configured to store instructions executable by the processor;

wherein the processor is configured to:
receive downlink data on a physical downlink shared channel (PDSCH);
generate transport block-level (TB-level) feedback information according to a reception result on the PDSCH, wherein the TB-level feedback information includes a reception result of the terminal for each TB contained in the PDSCH;
generate code block group-level (CBG-level) feedback information according to the reception result on the PDSCH, wherein the CBG-level feedback information includes a reception result of the terminal for each CBG in a TB that fails to be received on the PDSCH;
independently channel code the TB-level feedback information and the CBG-level feedback information;
report independently channel-coded TB-level feedback information and CBG-level feedback information to a base station.

The foregoing mainly takes the terminal and the base station as examples to introduce the solutions provided by embodiments of the present disclosure. It can be understood that, in order to implement the above-mentioned functions, the user equipment includes corresponding hardware structures and/or software modules for executing each function. In conjunction with the modules and algorithm steps of each example described in the embodiments disclosed in the present disclosure, the embodiments of the present disclosure can be implemented in hardware or a combination of hardware and computer software. Whether a function is performed by hardware or computer software driving hardware depends on the specific application and design constraints of the technical solution. Those skilled in the art may use different methods to implement the described functions for each specific application, but such implementation should not be considered beyond the scope of the technical solutions of the embodiments of the present disclosure.

Figure 8:
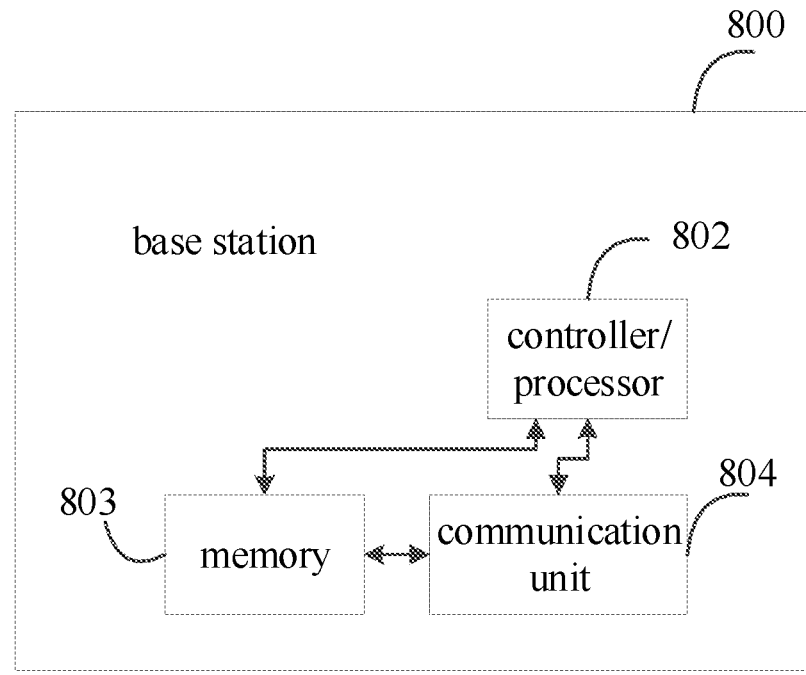
FIG. 8 is a schematic diagram of a structure of a base station according to an embodiment.

FIG. 8 is a schematic diagram of a structure of a base station according to an embodiment. The base station can be implemented as the base station in the system environment shown in FIG. 1.

The base station 800 includes a communication unit 804 and a processor 802. The processor 802 may also be a controller, which is represented as "controller/processor 802" in FIG. 8. The communication unit 804 is configured to support the base station to communicate with other network entities (e.g., other terminals or base stations, etc.).

Further, the base station 800 may further include a memory 803 for storing program codes and data of the base station 800.

It can be understood that FIG. 8 only shows a simplified design of the base station 800. In practical applications, the base station 800 may include any number of processors, controllers, memories, communication units, etc., and all base stations that can implement the embodiments of the present disclosure fall within the protection scope of the embodiments of the present disclosure.

Figure 9:
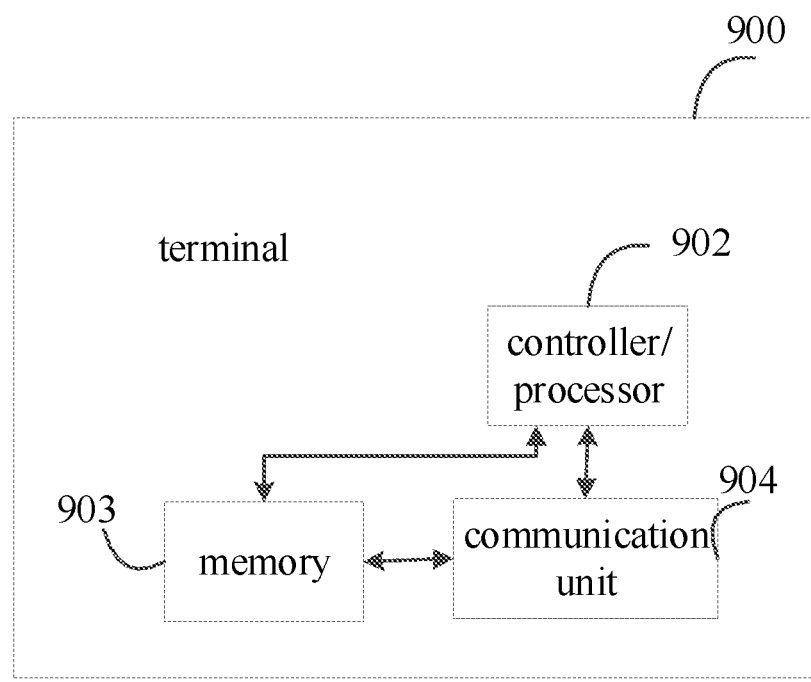
FIG. 9 is a schematic diagram of a structure of a terminal according to an embodiment.

FIG. 9 is a schematic diagram of a structure of a terminal according to an embodiment. The terminal may be implemented as the terminal in the system environment shown in FIG. 1.

The terminal 900 includes a communication unit 904 and a processor 902. The processor 902 may also be a controller, which is represented as "controller/processor 902" in FIG. 9. The communication unit 904 is configured to support the terminal to communicate with other network entities (e.g., other terminals or base stations, etc.).

Further, the terminal 900 may further include a memory 903 for storing program codes and data of the terminal 900.

It can be understood that FIG. 9 only shows a simplified design of the terminal 900. In practical applications, the terminal 900 may include any number of processors, controllers, memories, communication units, etc., and all terminals that can implement the embodiments of the present disclosure fall within the protection scope of the embodiments of the present disclosure.

Those skilled in the art should realize that, in one or more of the above examples, the functions described in the embodiments of the present disclosure may be implemented by hardware, software, firmware, or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage medium can be any available medium that can be accessed by a general purpose or special purpose computer.

Embodiments of the present disclosure further provide a computer storage medium for storing computer software instructions used by the above terminal or base station, which includes a program designed for executing the above method for transmitting hybrid automatic repeat request acknowledgement information.

Other embodiments of the present disclosure will readily occur to those skilled in the art upon consideration of the specification and practice of the invention disclosed herein. This disclosure is intended to cover any variations, uses, or adaptations of this disclosure that follow the general principles of this disclosure and include common general knowledge or techniques in the technical field not disclosed by this disclosure. The specification and examples are to be regarded as exemplary only, with the true scope and spirit of the disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for transmitting hybrid automatic repeat request acknowledgement information, performed by a base station, comprising:
receiving a feedback signal sent by a terminal when performing hybrid automatic repeat request (HARQ) feedback for a physical downlink shared channel (PDSCH);
parsing transport block-level (TB-level) feedback information from the feedback signal according to a number of bits of the TB-level feedback information in the feedback signal, wherein the TB-level feedback information comprises a reception result of the terminal for each TB contained in the PDSCH;
obtaining a number of bits of code block group-level (CBG-level) feedback information in the feedback signal according to the TB-level feedback information;
parsing the CBG-level feedback information from the feedback signal according to the number of bits of the CBG-level feedback information, wherein the CBG-level feedback information comprises a reception result of the terminal for each CBG in a TB that fails to be received on the PDSCH;
wherein, the TB-level feedback information and the CBG-level feedback information are sent by the terminal after independent channel coding.

2. The method according to claim 1, wherein before parsing the TB-level feedback information from the feedback signal according to the number of bits of the TB-level feedback information in the feedback signal, the method further comprises:
obtaining a number of TBs contained in the PDSCH;
obtaining the number of bits of the TB-level feedback information according to the number of TBs contained in the PDSCH.

3. The method according to claim 1, wherein obtaining the number of bits of the CBG-level feedback information in the feedback signal according to the TB-level feedback information comprises:
obtaining, according to the TB-level feedback information, a number of TBs that the terminal fails to receive on the PDSCH;
obtaining the number of bits of the CBG-level feedback information according to the number of TBs that the terminal fails to receive on the PDSCH.

4. The method according to claim 3, wherein the TB-level feedback information is a first sequence of n bits, n is a number of TBs contained in the PDSCH, and respective bits in the first sequence are in a one-to-one correspondence with respective TBs in the PDSCH; a bit value in the first sequence corresponding to the TB that the terminal fails to receive on the PDSCH is 0;
obtaining, according to the TB-level feedback information, the number of TBs that the terminal fails to receive on the PDSCH comprises:
obtaining a number m of bits with a value of 0 in the first sequence as the number of TBs that the terminal fails to receive on the PDSCH.

5. The method according to claim 4, wherein obtaining the number of bits of the CBG-level feedback information according to the number of TBs that the terminal fails to receive on the PDSCH comprises:
obtaining the number of bits of the CBG-level feedback information by multiplying the number m of bits with a value of 0 in the first sequence by a number k of CBGs contained in each TB.

6. The method according to claim 5, wherein parsing the CBG-level feedback information from the feedback signal according to the number of bits of the CBG-level feedback information comprises:
obtaining a second sequence containing m*k bits by parsing from the feedback signal;
obtaining the second sequence as the CBG-level feedback information.

7. The method according to claim 6, further comprising:
dividing the second sequence into m subsequences according to an order of bits in the sequence from front to back, wherein the m subsequences are in one-to-one correspondence with the TBs that the terminal fails to receive on the PDSCH.

8. The method according to claim 1, wherein parsing the CBG-level feedback information from the feedback signal according to the number of bits of the CBG-level feedback information comprises:
when the number of bits of the CBG-level feedback information is not 0, parsing the CBG-level feedback information from the feedback signal according to the number of bits of the CBG-level feedback information.

9. The method according to claim 1, wherein receiving the feedback signal sent by the terminal when performing HARQ feedback for the PDSCH comprises:
determining HARQ feedback resource corresponding to the PDSCH;
receiving the feedback signal on the HARQ feedback resource.

10. A method for transmitting hybrid automatic repeat request acknowledgement information, performed by a terminal, comprising:
receiving downlink data on a physical downlink shared channel (PDSCH);
generating transport block-level (TB-level) feedback information according to a reception result on the PDSCH, wherein the TB-level feedback information comprises a reception result of the terminal for each TB contained in the PDSCH; wherein the TB-level feedback information is used to obtain a number of TBs that the terminal fails to receive on the PDSCH;
generating code block group-level (CBG-level) feedback information according to the reception result on the PDSCH, wherein the CBG-level feedback information comprises a reception result of the terminal for each CBG in a TB that fails to be received on the PDSCH, and a number of bits of the CBG-level feedback information corresponds to the number of TBs that the terminal fails to receive on the PDSCH;
independently channel coding the TB-level feedback information and the CBG-level feedback information;
reporting independently channel-coded TB-level feedback information and CBG-level feedback information to a base station.

11. The method according to claim 10, wherein the TB-level feedback information is a first sequence of n bits, n is a number of TBs contained in the PDSCH, and respective bits in the first sequence are in one-to-one correspondence with respective TBs in the PDSCH.

12. The method according to claim 11, wherein a bit value in the first sequence corresponding to the TB that the terminal fails to receive on the PDSCH is 0; the CBG-level feedback information is a second sequence of m*k bits; m is a number of bits with a value of 0 in the first sequence, and k is a number of CBGs contained in each TB;

generating the CBG-level feedback information according to the reception result on the PDSCH comprises:

generating, according to the reception result on the PDSCH, a k-bit subsequence corresponding to each of the TBs that the terminal fails to receive on the PDSCH;

obtaining the second sequence by connecting end-to-end the k-bit subsequences corresponding to the TBs that the terminal fails to receive on the PDSCH.

13. The method according to claim 10, wherein reporting the independently channel-coded TB-level feedback information and CBG-level feedback information to the base station comprises:

determining HARQ feedback resource corresponding to the PDSCH;

sending the independently channel-coded TB-level feedback information and CBG-level feedback information on the HARQ feedback resource.

14. A base station, configured to implement the method for transmitting hybrid automatic repeat request acknowledgement information according to claim 1, comprising:

a processor and a memory configured to store instructions executable by the processor, wherein the processor is configured to implement the method for transmitting hybrid automatic repeat request acknowledgement information according to claim 1 by executing the instructions stored in the memory.

15. A terminal, comprising:

a processor and a memory configured to store instructions executable by the processor, wherein the processor is configured to:

receive downlink data on a physical downlink shared channel (PDSCH);

generate transport block-level (TB-level) feedback information according to a reception result on the PDSCH, wherein the TB-level feedback information comprises a reception result of the terminal for each TB contained in the PDSCH; wherein the TB-level feedback information is used to obtain a number of TBs that the terminal fails to receive on the PDSCH;

generate code block group-level (CBG-level) feedback information according to the reception result on the PDSCH, wherein the CBG-level feedback information comprises a reception result of the terminal for each CBG in a TB that fails to be received on the PDSCH, and a number of bits of the CBG-level feedback information corresponds to the number of TBs that the terminal fails to receive on the PDSCH;

independently channel code the TB-level feedback information and the CBG-level feedback information;

report independently channel-coded TB-level feedback information and CBG-level feedback information to a base station.

16. The terminal according to claim 15, wherein the TB-level feedback information is a first sequence of n bits, n is a number of TBs contained in the PDSCH, and respective bits in the first sequence are in one-to-one correspondence with respective TBs in the PDSCH.

17. The terminal according to claim 16, wherein a bit value in the first sequence corresponding to the TB that the terminal fails to receive on the PDSCH is 0; the CBG-level feedback information is a second sequence of m*k bits; m is a number of bits with a value of 0 in the first sequence, and k is a number of CBGs contained in each TB;

the processor is configured to:

generate, according to the reception result on the PDSCH, a k-bit subsequence corresponding to each of the TBs that the terminal fails to receive on the PDSCH;

obtain the second sequence by connecting end-to-end the k-bit subsequences corresponding to the TBs that the terminal fails to receive on the PDSCH.

18. The terminal according to claim 15, wherein the processor is configured to:

determine HARQ feedback resource corresponding to the PDSCH;

send the independently channel-coded TB-level feedback information and CBG-level feedback information on the HARQ feedback resource.

* * * * *